Dec. 15, 1942.　　　M. S. KING　　　2,305,348
SELECTIVE BEVERAGE VENDOR
Filed Aug. 4, 1940　　　7 Sheets-Sheet 2

Inventor
MILLER S. KING,

Dec. 15, 1942.  M. S. KING  2,305,348
SELECTIVE BEVERAGE VENDOR
Filed Aug. 4, 1940  7 Sheets-Sheet 3
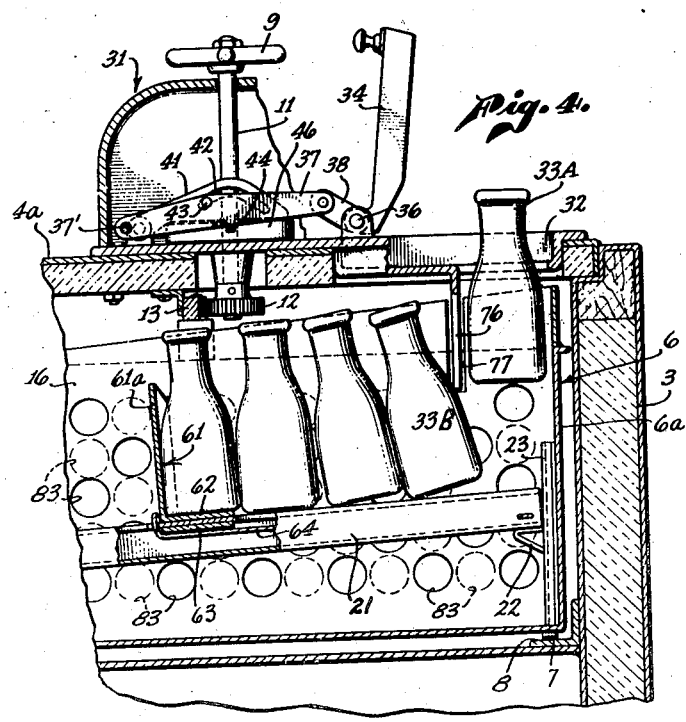
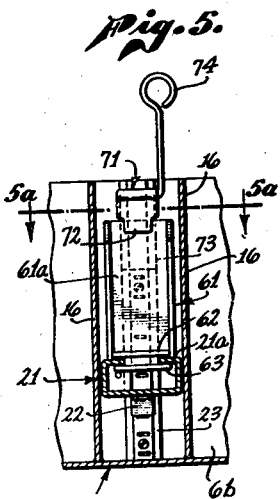
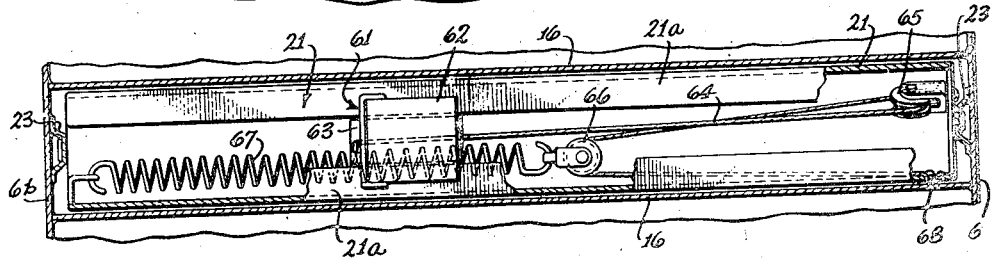
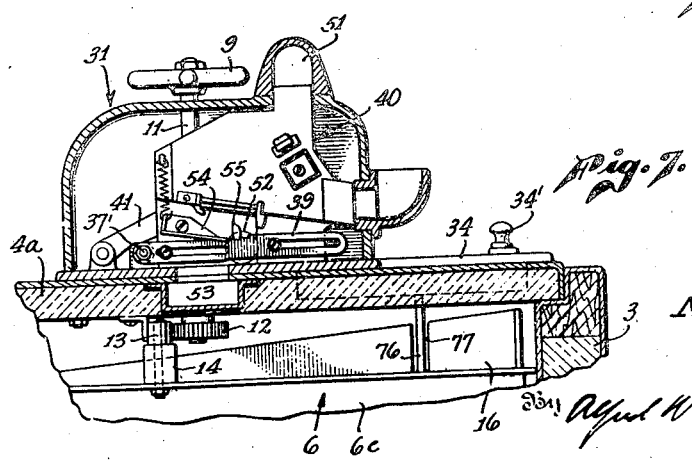
Inventor
MILLER S. KING,
Attorney Dec. 15, 1942.   M. S. KING   2,305,348
SELECTIVE BEVERAGE VENDOR
Filed Aug. 4, 1940   7 Sheets-Sheet 4
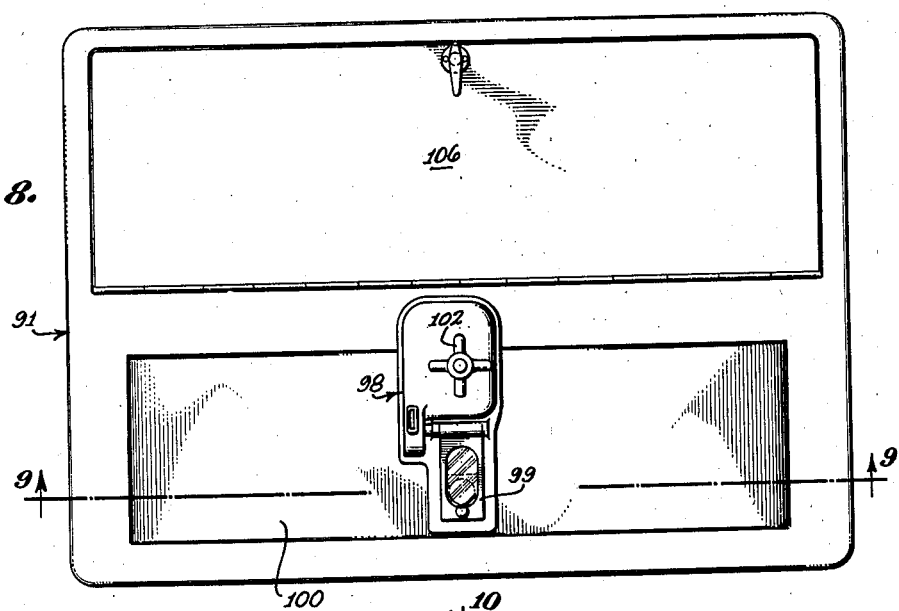
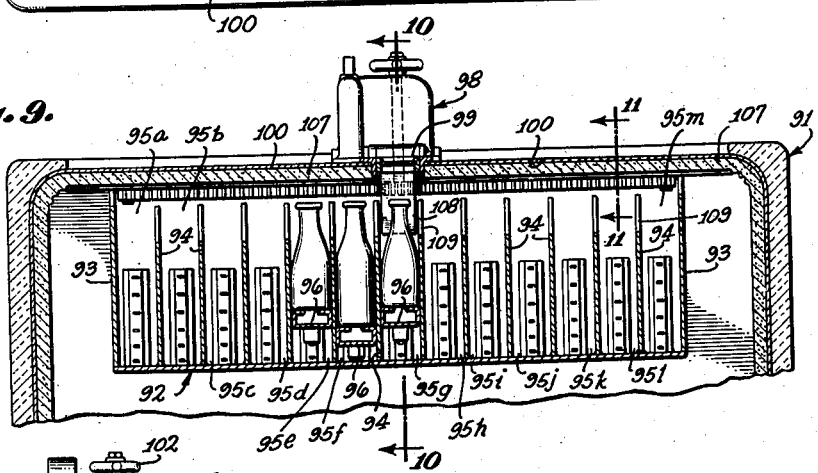
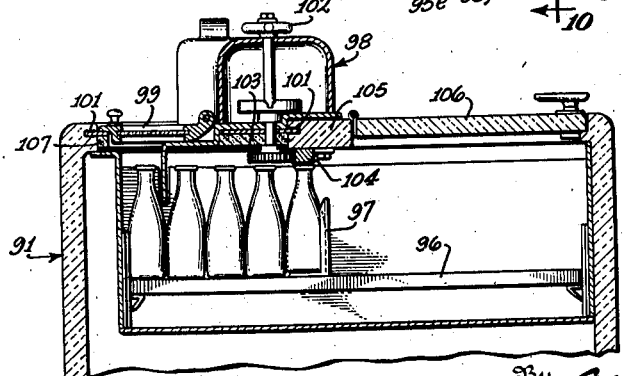
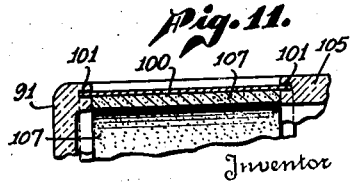
Inventor
MILLER S. KING,
By Alfred W. Knight
Attorney

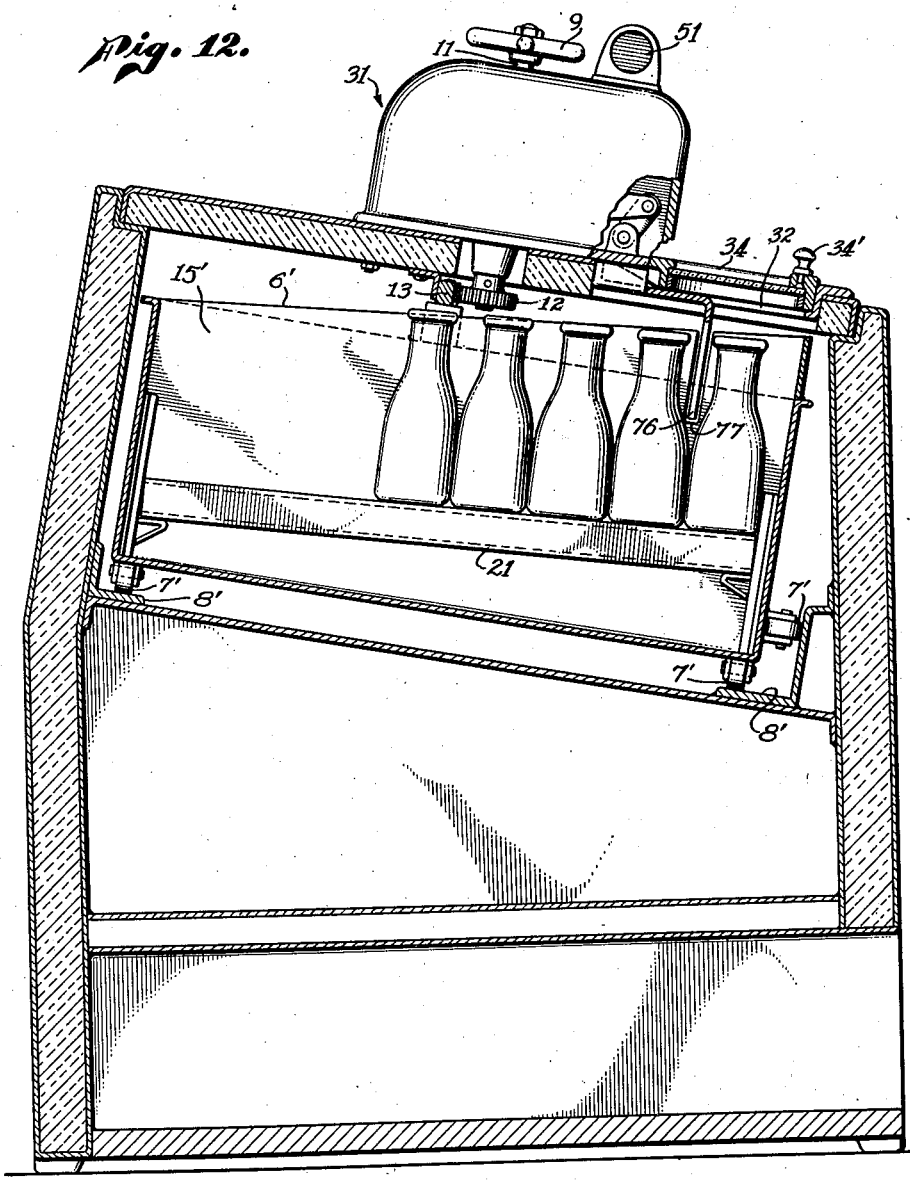

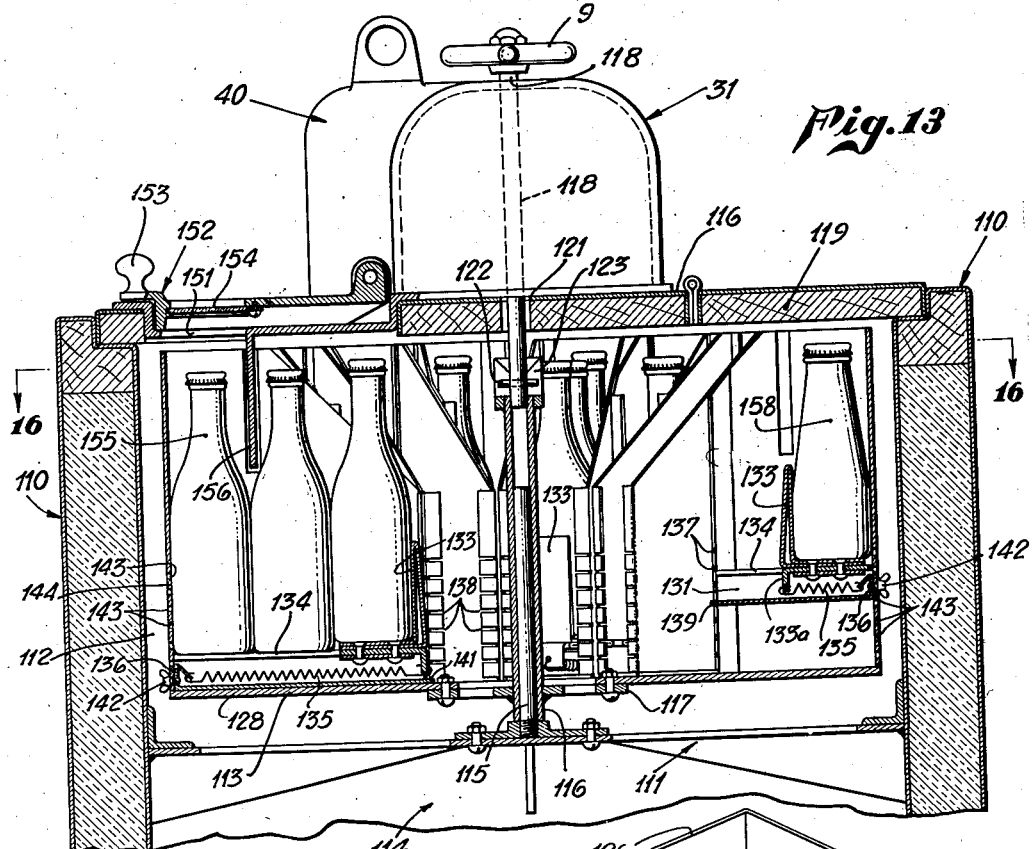

Dec. 15, 1942.                M. S. KING                2,305,348
                        SELECTIVE BEVERAGE VENDOR
                          Filed Aug. 4, 1940              7 Sheets-Sheet 7
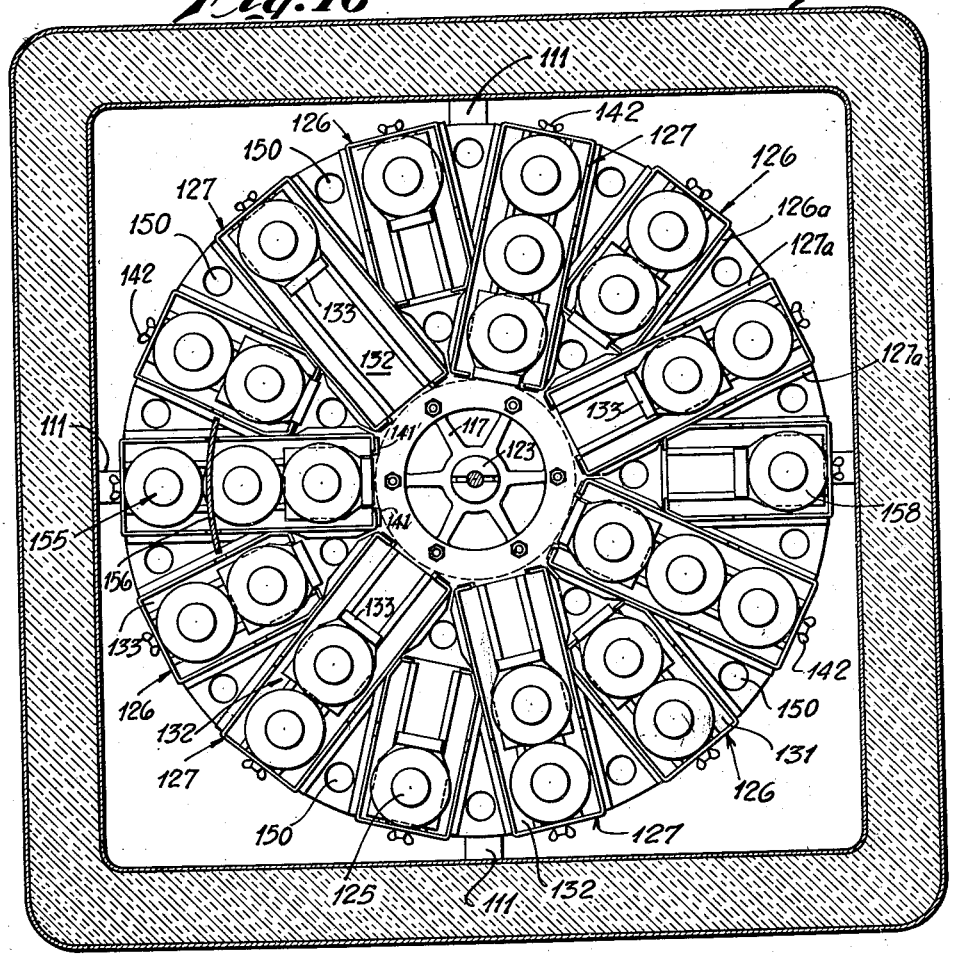
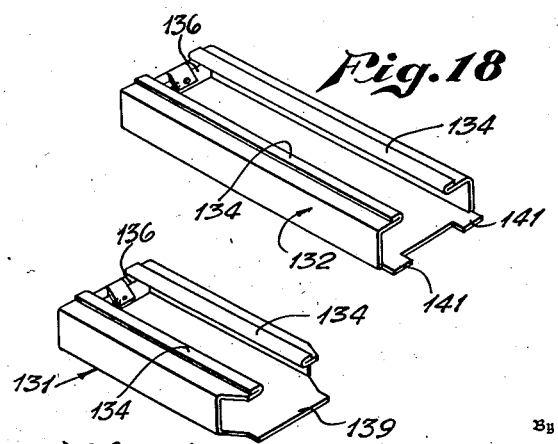
Inventor:
MILLER S. KING,
By Alfred W. Knight
Attorney.

Patented Dec. 15, 1942

2,305,348

UNITED STATES PATENT OFFICE 2,305,348

SELECTIVE BEVERAGE VENDOR

Miller S. King, Berkeley, Calif.

Application August 4, 1940, Serial No. 351,325

20 Claims. (Cl. 312—36)

This invention relates to vending devices and pertains particularly to a device which may be employed to vend any one of a plurality of different sized containers. The device of this invention is adapted primarily for the storage and subsequent vending of a comparatively large number of containers which may be of different sizes, wherefore from a single vending device an individual may select one or more different commodities.

One of the particular objects of the invention is to provide a bottle-vending machine provided with suitable coin-controlled mechanism which is adapted, upon the insertion of a proper coin, to permit access by the user to a single compartment in the machine from which a given and preselected bottle may be withdrawn and which is characterized particularly by the provision of an internal storage receptacle adapted to receive a plurality of different sized or shaped bottles, which may equivalently be withdrawn from the device by the user.

A further object of the invention is to provide a vending device of the character set forth, provided with a coin-controlled vending discharge member and a relatively movable storage receptacle, through which, by relative movement of the vending discharge member and the storage receptacle, the user may bring the same into relative alinement such that a bottle or other container may be withdrawn from any preselected portion of the receptacle.

A further object of the invention is to provide a vending device of the character described, which is adapted to store and subsequently vend a comparatively large number of containers with a minimum requirement of floor space for the device. A further object of the invention is to provide a vending device characterized by the provision of a receptacle member adapted to receive a plurality of bottles of different sizes and shapes, the bottles of a particular size or shape being arranged in a series in a compartment or subdivision of such receptacle and the compartments defining the several series of bottles being arranged in a generally side-by-side relation, and including means in each compartment for causing the bottles of the contained series to move toward one end of such compartment, together with dispensing means located at the side of the receptacle and relatively movable with respect thereto, wherefore the dispensing means may be disposed in dispensing relation to any one of said series of bottles for the withdrawal of a designated or preselected bottle from the device.

The device of the present invention comprises, essentially, an external housing member which carries an internal receptacle together with refrigerating means adapted to maintain the contents at a desired subatmospheric temperature, and an external dispensing member through which bottles may be withdrawn from the internal receptacle. The external dispensing means and the internal receptacle are mounted for relative movement with respect to one another and the internal receptacle is provided with suitable compartments adapted to receive a plurality of containers such as bottles in an upright position and disposed in a series arrangement therewithin, the relative movement between said receptacle and the external dispensing means being such as to permit the user to bring any one of such series of bottles or other containers into alinement with the discharge or dispensing member for withdrawal of one container.

The relative movement between the dispensing member and the internal receptacle may be secured in any one of several manners, as by arranging the dispensing member in fixed relation upon the external housing and providing for a movable internal receptacle, or vice versa. Similarly, a rectilinear internal receptacle adapted for longitudinal relative movement or a circular internal receptacle adapted for rotative relative movement may be provided.

Further objects of the invention will be brought out in the ensuing description of certain preferred embodiments thereof, or will be apparent from such description. The accompanying drawings illustrate four embodiments of the invention, and referring thereto:

Fig. 4 is a view, partly broken away, corresponding to Fig. 2, showing the dispensing member in operated position, and illustrating the withdrawal of one bottle of a series;

Fig. 5 is a sectional detail of the construction taken on line 5—5 in Fig. 2;

Fig. 5a is a transverse sectional detail taken on line 5a—5a in Fig. 5 on somewhat enlarged scale;

Fig. 6 is a transverse section taken on line

Figure 1:
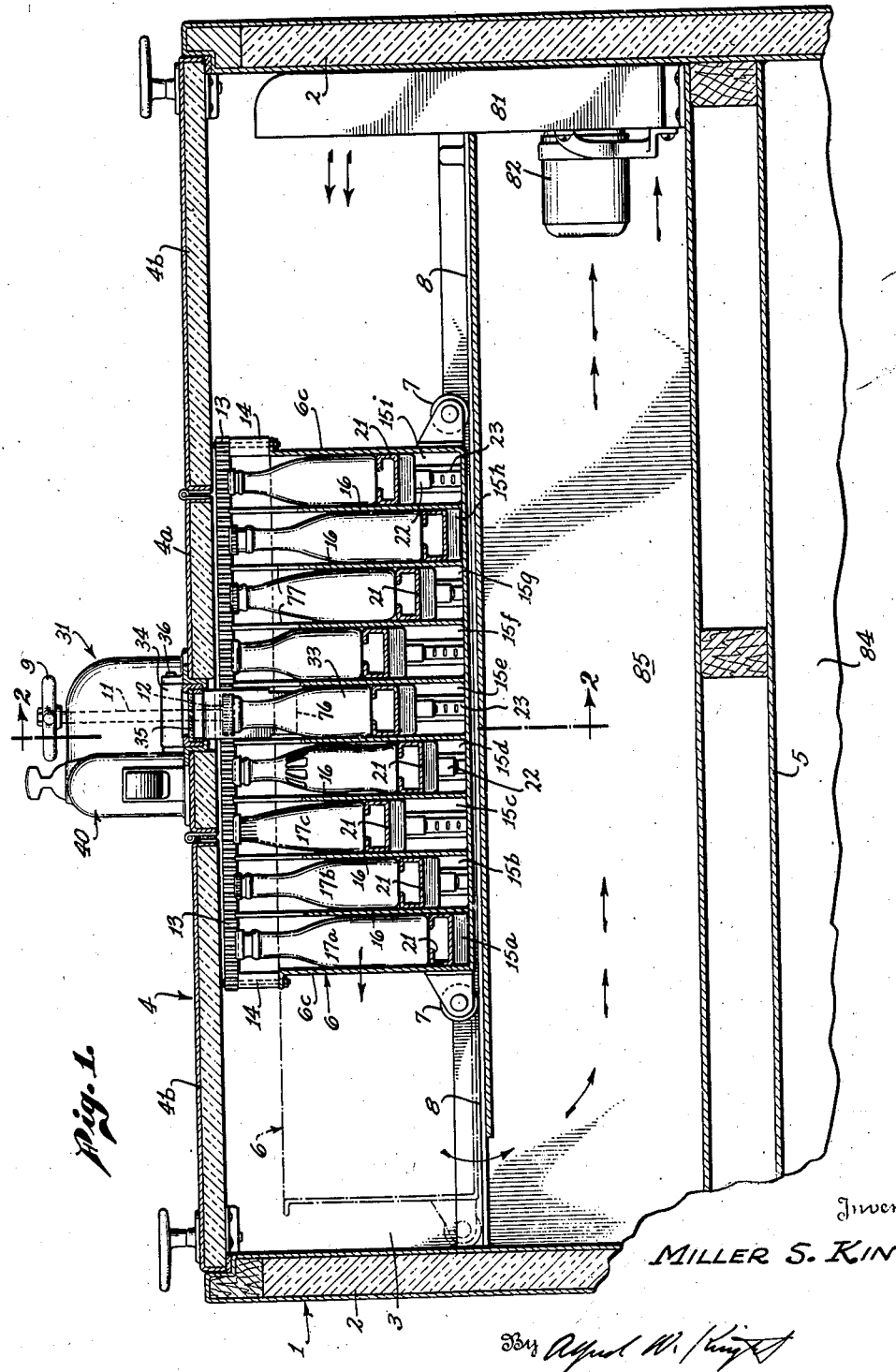
Fig. 1 is a longitudinal vertical section of one form of dispensing device according to the present invention.
Figure 2:
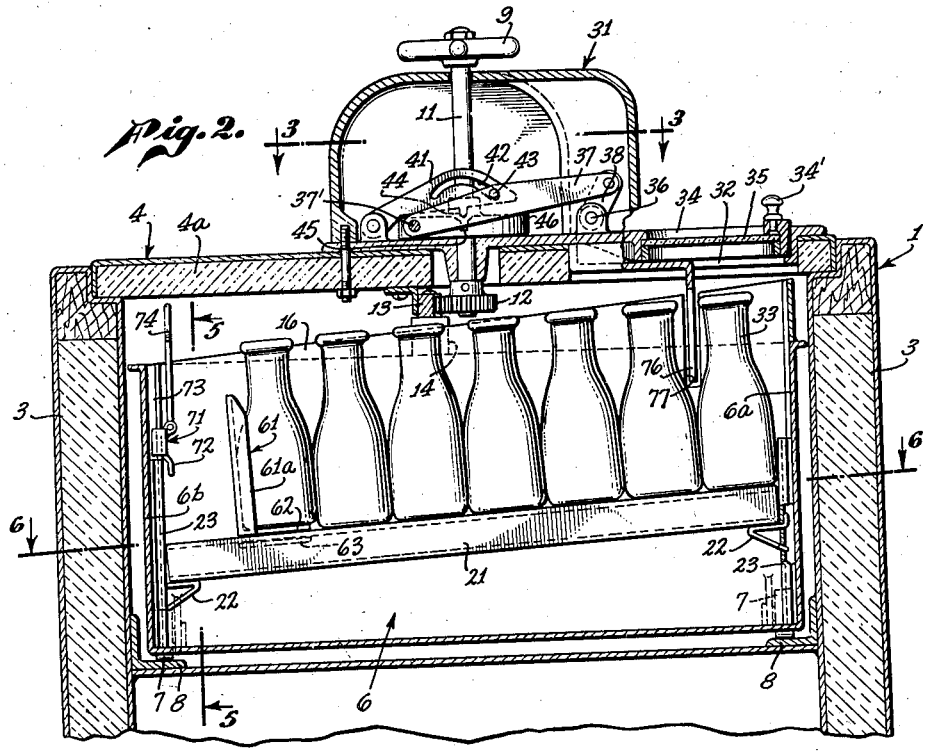
Fig. 2 is a transverse section thereof taken on line 2—2 in Fig. 1, said line being further located by line 2—2 in Fig. 3.
Figure 3:
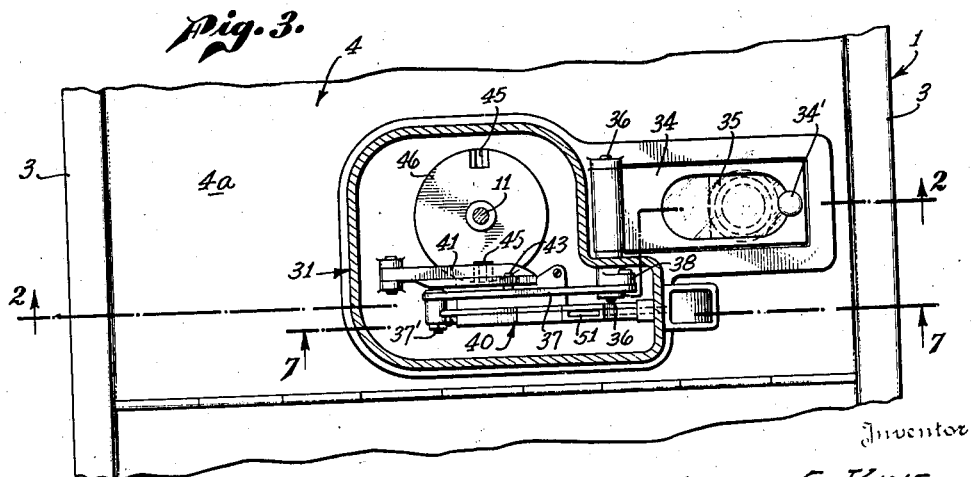
Fig. 3 is a horizontal section taken on line 3—3 in Fig. 2, showing details of the dispensing mechanism.

6—6 in Fig. 2, showing the construction of the supporting means which are provided for support of a given series of containers within the device;

Fig. 7 is a transverse sectional detail of the dispensing mechanism, taken on line 7—7 in Fig. 3;

Fig. 8 is a plan view of a modified form of the invention;

Fig. 9 is a longitudinal section thereof corresponding to Fig. 1 and taken on line 9—9 in Fig. 8;

Fig. 10 is a transverse section thereof, taken on line 10—10 in Fig. 9;

Fig. 11 is a sectional transverse detail thereof taken on line 11—11 in Fig. 9;

Fig. 12 is a view corresponding to Fig. 10, showing a further modification of the structure;

Fig. 13 is a partly broken-away transverse section of an alternative embodiment of the invention;

Figs. 14 and 15 are perspective views of two forms of internal container-receptacle elements which may be employed in the form of invention shown in Fig. 13;

Fig. 16 is a partly broken-away plan view of the form of invention shown in Fig. 13, taken on line 16—16 therein;

Figs. 17 and 18 are perspective views of two types of container supporting means which may be employed with the internal container-receptacle elements shown respectively in Figs. 14 and 15; and Fig. 19 is a perspective view of a follower member which may be used in the form of device shown in Figs. 13 and 16, to force a given series of containers forwardly into position to be dispensed from the device.

Referring to Figs. 1 through 7 of the drawings, the device is shown as comprising an external housing 1, which is preferably of an insulated construction and formed of end walls 2, side walls 3, a top wall 4 (which may be formed as a central partition 4a and end partitions 4b, the latter being hingedly mounted to the center partition 4a), and a bottom wall 5.

A storage receptacle 6 is provided within the housing 1, said storage receptacle being provided with side walls 6a and 6b and end walls 6c, and in the present form of the invention being made of less length than the interior dimension of the housing 1 and being mounted for longitudinal movement within said housing, as through the agency of roller means 7 mounted on the housing 6 and carried by a fixed rail or angle iron member 8 secured to the side walls 3 of said housing. Suitable means are provided for effecting the longitudinal movement of the supply receptacle 6, such as a hand wheel 9 carried by a vertically extending shaft 11 which is rotatably mounted on the partition 4a and extends therethrough into the interior of the housing 1 above the storage receptacle 6, said shaft being provided with a spur gear or pinion 12 on the lower end thereof meshing with a gear rack 13 fixedly secured to the supply receptacle 6 at the respective ends thereof, as indicated at 14.

The supply receptacle 6 is divided into a plurality of transversely extending supply compartments 15a, 15b, 15c, etc., through the agency of a plurality of transversely extending partitions 16, each supply compartment 15a, etc., being adapted to store a series of bottles or the like 17a, 17b, 17c, etc. Within each supply compartment 15a, etc., I provide a removable shelf member 21, the details of which are shown more particularly in Figs. 5 and 6, each of the shelf members 21 being of the same general shape and description and being interchangeable within the compartments 15a, etc. The shelf members 21 are adjustably mounted for vertical movement within the respective supply compartments, as through the agency of shelf support brackets 22, which may be positioned at any given height with respect to the depth of the supply compartment through the agency of a support rail 23 at each end of the compartment, each support rail being provided with a plurality of vertically spaced openings adapted to receive coactingly shaped projections on the shelf brackets 22 in a known manner. In this particular embodiment of the invention the shelf members 21 are preferably disposed in an inclined relation, i. e., inclined upwardly toward the discharge side of the device, in order to bring the top of the bottles as high as possible at the discharge side yet allow the bottles to pass freely under the rack 13, all as will be more specifically brought out hereinafter.

The dispensing mechanism is located medially of the length of the housing 1 and is indicated generally at 31. This mechanism is conveniently secured to the central partition 4a and provides an aperture 32 located immediately above the end bottle in each of the contiguous series of bottles 17a, etc., such a bottle being indicated at 33 in Figs. 1 and 2, for example. A suitable cover for the opening 32 is provided, such as a hinged lid 34 provided with a clear glass or composition window 35 and pivotally mounted to the partition 4a as at 36. Suitable means are provided for preventing the lid 34 from being opened until a proper coin has been inserted in the coin mechanism, the latter being indicated generally at 40 in Figs. 1, 3, and 7, and also for preventing the lid from opening unless one of the supply compartments 15a, etc., is properly disposed immediately below the opening 32. The mechanism for preventing the lid from opening at an improper time may comprise a link arm 37 pivotally secured to the lid 34 through a bell crank arm 38 at one end and pivotally secured as at 37' to a release arm or bolt 39 which is slidably mounted on the coin mechanism. Pivotally secured to the partition 4a I provide a second link arm 41 provided with a cam slot 42 engaged by a pin 43 in the arm 37, said link arm 41 being provided with a downwardly projecting detent 44 adapted to engage either of two diametrically spaced recesses 45 provided near the circumference of a hub member 46 secured to the shaft 11. The spur gear or pinion 12 is of such diameter, for example, that one-half revolution thereof will cause the receptacle 6 to move longitudinally a distance corresponding to the separation of the contiguous partition 16, and the recesses 45 in the hub member 46 are so arranged that when one of the recesses is alined below the detent 44, one of the supply compartments 15a, etc., will be disposed directly below the opening 32.

When the lid member 34 is in its closed position, as indicated in Figs. 1 and 2, the pin 43 carried by the link arm 37 is at a forward position in the cam slot 42, holding the link arm 41 clear of the hub member 46. In this condition the hand wheel 9 may be operated by the user, and the receptacle 6 moves longitudinally to any desired position. The user may inspect the containers or bottles within the receptacle by glancing downwardly through the clear glass partition 35, until the desired bottle is in view, at which time he may insert a proper coin into the coin inlet 51 of the coin mechanism 40, and if the coin is actually a proper coin it will drop downwardly through the coin-selecting mechanism to a position such as that shown at 52. In this position, the knob 34' on the lid 34 may be lifted upwardly and the lid 34 swung rearwardly to a position such as that indicated in Fig. 4, and during this upward movement of the lid the link arm 37 will carry the bar 39 rearwardly, force the coin from the position 52 into a coin receptacle 53, and if the hand wheel is properly alined so that the detent 44 will engage in a recess 45, the door is completely opened. However, if the coin is not present at the position 52 or if a coin of improper diameter is present, the rearward movement of the bolt 39 will be stopped through the agency of a spring-biased detent member 54 positioned to engage one or more notches 55 provided in the bolt 39, said detent member being also adapted for engagement with the coin at the position 52 and to be thus lifted away by the cam action of such coin as it is carried rearwardly by the bolt 39, so as to avoid engagement with one or more of the notches 55. This mechanism is a more or less standardized mechanism employed in other forms of coin-controlled devices, and is illustrated herein merely from the standpoint of completeness. It will be appreciated that other types of coin-controlled mechanisms may equivalently be employed, without departure from this invention.

After the lid 34 is opened a bottle may be withdrawn from the supply compartment, as indicated at 33A in Fig. 4, and for the purpose of crowding the series of bottles forwardly in this particular form of the invention so that a new bottle 33B will be brought into the position occupied by the bottle 33A, I provide a follower member 61 slidably mounted upon the shelf member 21 and spring-biased in a forward direction. This follower member 61 is more particularly illustrated in Figs. 4, 5, and 6, as is the construction of the shelf member itself, and referring thereto the shelf member is shown as formed as a flat sheet bent upwardly at the sides and over at the top into a general U cross-section, providing slides 21a on which the several bottles of a series may rest, as shown in Fig. 4, and on which the follower member 61 may ride. The follower 61 is formed as a base plate 62 adapted to rest upon the upper surface of the slide 21a and a subjacent flange member 63 positioned below the slide members 21a (and interlocking therewith against vertical displacement of the follower 61 from the shelf member 21), and a follower plate 61a extending upwardly to a position preferably such as to always fall above the middle of the height of any bottle which the supply compartments are adapted to receive (in order to properly force the series of bottles forwardly toward dispensing position). For the purpose of biasing the follower 61 forwardly, I may provide a cable member 64 secured to the base plate 62 and extending forwardly to adjacent the forward end of the shelf member 21, thence over a pivotally mounted pulley 65, thence rearwardly over a pivotally mounted pulley 66 which is secured to the rearward end of the shelf member 21 through the agency of a tension spring 67, the cable 64 then extending forwardly to the end of the shelf member 21 and being secured thereto as at 68. It will be apparent that as the follower member is moved rearwardly, i. e., away from the position of the pulley 65, the spring 67 will be extended and placed under greater tension, such tension serving to force the series of bottles which may rest upon the slide 21 forwardly due to the pressure of the plate 61a.

In order to facilitate the loading of a plurality of bottles in a given series within a given supply compartment, I preferably provide suitable means for fixing the follower 61 at its extreme rearward position during the loading operation, as through the agency of a vertically slidable detent member 71 provided with a lip 72 adapted to engage the upper edge of the plate 61a, said detent member 71 being slidably mounted (as shown particularly in Figs. 5 and 5a) on an upwardly extending guide member 73 secured to the side wall of the receptacle. After the desired number of bottles is placed within a particular supply compartment the detent member 71 may be disengaged from the plate 61a by pulling upwardly on the detent member through the agency of a handle 74, allowing the plate 61a to come into engagement with the series of bottles, after which the detent member may be pushed downwardly to get it out of the way and allow free longitudinal movement of the receptacle 6. Such a lowered position of the detent member is shown in Fig. 2.

It will be appreciated that as a bottle 33A is withdrawn through the opening 32, as illustrated in Fig. 4, the remaining bottles in that particular series will be forced toward the forward side wall 6a of the receptacle 6, as above described, and that it is necessary to provide a suitable stop member to prevent the next succeeding bottle 33B from being forced into the extreme forward position, which may be considered to constitute a "discharge zone," i. e., placed in position for withdrawal through the opening 32 after completion of the withdrawal of bottle 33A. For this purpose I provide a fixed stop member 76 secured to the central partition 4a and extending downwardly therefrom to a level well below the upper or top end of the bottle in the series. This stop member is positioned rearwardly from the wall 6a a distance approximately equal to the width of a supply compartment 15a, etc., so as to be intermediate the position of the two adjacent bottles located at the discharge zone, and is positioned across a significant proportion of the width of the opening 32 (in the direction of longitudinal movement of the receptacle 6). When a bottle 33A is withdrawn, the purchaser is thus prevented from withdrawing another bottle without again operating the dispensing mechanism, including the insertion of a new coin, inasmuch as the longitudinal movement of the receptacle 6 is prevented as long as the lid 34 is in raised position, and it will be necessary for the purchaser to lower the lid 34 to its closed position, rotate the hand wheel 9 so as to move the receptacle 6 longitudinally and aline an adjacent supply compartment with the opening 32 before another bottle can be withdrawn. This will cause the receptacle 6 and the particular supply compartment which was previously alined with the opening 32 to move away from the position of the opening 32, on which occasion the remaining bottles in the series from which the bottle 33A was withdrawn will move forwardly toward the side wall 6a of the receptacle when the supply compartment is moved out of the way of the stop member 76. The bottles will then assume the position indicated in Fig. 2, and further longitudinal movement of the supply receptacle 6 will cause the respective bottles in the series to pass at opposite forward and rearward sides of the stop member 76 due to its location intermediate the position of two adjacent bottles as illustrated in said Fig. 2. If the purchaser wishes to remove another bottle of the same type as that removed at 33A, it is merely necessary for him to again operate the hand wheel 9 to bring the same supply compartment under the opening 32, at which time a new coin may be inserted and the withdrawal procedure repeated. The partitions 16 are preferably slotted as at 77 wherefore relative movement between the receptacle 6 and the stop member 76 is permitted.

Referring particularly to Fig. 1, it will be seen that in this embodiment of the invention the supply receptacle 6 is provided with a sufficient number of partitions 16 to provide nine supply compartments 15a, 15b, through 15i, and that these several supply compartments may be caused to accommodate bottles of different height, by placing the shelf members 21 at the proper level below the top edge of the receptacle 6 to bring the tops of the bottles in general alinement. Dispensing devices or vending machines for bottled goods have heretofore been proposed which would provide for the storage and dispensing of a plurality of bottles of any one given size or shape, but the invention of the present application provides for the first time for the dispensing of any one of a plurality of different sized bottles, within the capacity limits and size limits of the particular supply receptacle employed.

The space within the housing 1 which accommodates the movable supply receptacle is preferably maintained under refrigeration, as through the agency of a refrigeration unit 81 provided with a power-driven fan indicated at 82 which will cause a positive circulation of cold air past and through the receptacle 6, the end walls 6c and partitions 16 of which are preferably perforated as indicated at 83 to facilitate free circulation of the refrigerated air. The perforations in successive partitions are preferably staggered, as may be seen from an inspection of Fig. 4, so that the air circulation is prevented from channeling through the receptacle, to insure proper cooling of the bottles. It will be appreciated that the space 84 below the bottom wall 5 of the refrigerated chamber may be employed for the storage of empty bottles, according to the requirements of the particular use to which the vending machine is placed, and the space 85 immediately below the vending structure may be used for storage of bottles which are to be charged into the receptacle 1, inasmuch as the space 85 is also under refrigeration by reason of the return air circulation to the fan 82.

In Figs. 8 through 11 I have illustrated a modified form of construction, in which the supply receptacle is maintained in a relatively fixed relation, and the dispensing mechanism is moved relative thereto. This construction provides a greater capacity and a greater variety in the selection of different bottled goods than the first-described form of the invention, and referring to these figures, a housing is indicated at 91, provided with an internal fixed receptacle 92 having end walls 93 and a plurality of partitions 94 corresponding to the partitions 16 above. The partitions 94 and the end walls 93 define a plurality of supply compartments 95a, 95b, etc., through 95m, each of which is provided with an adjustable shelf member 96 corresponding to the shelf member 21 above, and each shelf member 96 is provided with a follower plate 97 which may be spring-biased in the manner illustrated particularly in Fig. 6. A dispensing mechanism is indicated at 98, including a door member 99 corresponding to the door member 34 above, and this dispensing mechanism including the door member 99 is mounted on a flexible slide 100 guided and supported in suitable slots 101 formed in the housing 91 and adapted for longitudinal movement with respect to the housing, i. e., in a direction transverse to the extension of the supply compartment 95a, etc. The door member 99 is located adjacent one end of the several supply compartments, in a manner corresponding to the location of the opening 32 in Fig. 4, and relative movement of the dispensing mechanism with respect to the supply receptacle is obtained through the agency of a hand wheel 102 corresponding to the hand wheel 9 which is geared through a pinion 103 to a fixed rack 104 which may be secured to the upper wall 105 of the housing. A suitable door 106 is provided for access to the interior of the housing, to fill the respective supply compartments. The coin mechanism and the locking means for fixing the dispensing mechanism 98 with respect to any one of the several supply compartments 95a etc., may conform to the structure illustrated in connection with the first form of the invention, as will be apparent to one skilled in the art. The free end of the slide 100 may be allowed to pass into the space below the supply receptacle 92, suitable guides being provided therefor to prevent the guides from becoming bent or otherwise deformed, as should be apparent, and I preferably provide a layer of flexible insulating material such as wool felt at the inner surface of the slide 100, as shown at 107, to insulate the same from the refrigerated space within which the supply receptacle 92 is located, and thus minimize condensation of atmospheric moisture on the outer surface of the slide, which might be considered objectionable.

The operation of the form of vending device shown in Figs. 8–11 is entirely comparable to that described in connection with the form shown in Figs. 1 through 7, with the exception that operation of the hand wheel 102 will cause the slide 100 and the entire dispensing mechanism 98 to move longitudinally of the housing. A suitable stop member 108, corresponding to the stop member 76 in the first form of the invention, will be provided in fixed relation to the dispensing mechanism 98, and the partition 94 will be slotted as at 109 to permit free relative longitudinal movement of the dispensing mechanism through and to the respective supply compartments 95a, etc.

The form of device illustrated in Fig. 12 is essentially the same as that shown in Fig. 1, with the exception that the receptacle 6' (corresponding to the receptacle 6) is mounted in a transversely inclined position on rollers 7' and rails 8' whereby the several bottles or containers of each series in a particular supply compartment 15' would be caused to move toward the dispensing side of the device under the influence of gravity, thereby eliminating the requirement of a biasing member such as shown at 61. In Fig. 12 reference numerals corresponding to those used in connection with Figs. 1 to 7 have been employed on similar parts.

In Figs. 13 through 19 I have illustrated another modification of the invention in which the various containers or articles to be dispensed are arranged in a plurality of radially extending series, the desired relative movement of the parts to secure the selective withdrawal of one or the other of the containers being obtained by rotary movement. A heat insulating external housing 110 is provided, carrying a support spider 111 at a level such as to define a space 112 at the upper end of the housing 110 within which the container receptacle 113, of generally cylindrical shape, is disposed, and a space 114 below the space 112 within which a refrigeration unit (not shown) may be disposed as in the first described form of the invention. The receptacle 113 is rotatably mounted on the spider 111, to which a stub shaft 115 may be attached in a position to receive a bearing tube 116 carrying a spider 117 upon which the receptacle 113 is mounted. The receptacle 113 is thus rotatable about the stub shaft 115, and the desired rotation thereof may be secured through the agency of a drive shaft 118 corresponding to the shaft 11 above described and extending through the housing portion of the coin-operated dispensing mechanism 31, which may be of the same type as that shown above. The shaft 118 preferably terminates in a knob or hand wheel 9. The dispensing mechanism 31, carrying the shaft 118, is conveniently secured to the upper wall 119 of the housing 110, the shaft 118 being extended through a suitable opening 121 therein. The shaft 118 may be provided with a transversely extending pin 122 adjacent its lower end, meshing with a slotted coupling member 123 which is secured to the tube 116 whereby the receptacle 113 may be rotated by operation of the hand wheel 9.

The receptacle 113 is provided with a plurality of radially arranged supply compartments each adapted to receive a plurality of containers or bottles such as are indicated at 125 in Fig. 16. The supply compartments are arranged, for compactness, to receive alternately two and three bottles, respectively, the two-bottle supply compartments being designated at 126 and the three-bottle supply compartments being designated at 127. In this specific embodiment, seven two-bottle supply compartments 126 and seven three-bottle supply compartments 127 are employed.

Referring particularly to Figs. 14 and 15, the supply compartments 126 and 127 may be formed as sheet metal box-like members provided with laterally projecting flanges 126a and 127a along the lower edges of the side walls, which may be spot-welded or otherwise secured to the bottom wall 128 of the receptacle 113. Each of the supply compartments is provided with a shelf member which is adapted to be positioned in any one of a plurality of vertically spaced levels within such supply compartment, the respective shelf members for the two- and three-bottle supply compartments being illustrated in Figs. 17 and 18, at 131 and 132. Each of these shelf members is provided with a slidably mounted backing plate which may be of the type illustrated in Fig. 19 at 133, disposed on opposed longitudinally extending guides 134 on the respective shelf members, such backing plates being illustrated in position in Figs. 13 and 16. A suitable biasing member such as a spring 135 is provided to bias the backing plate 133 radially outwardly along the guides 134 in each supply compartment, such spring being conveniently secured to a depending lower lip 133a on the backing plate at one end and to the outer end wall 136 of the shelf members. In order to adjustably position the shelf members at various vertically spaced levels within each supply compartment I may provide a plurality of vertically spaced slots at the inner end wall of the supply compartments 126 and 127 as at 137 and 138, and provide matingly positioned tab members 139 and 141 on the lower wall of the respective shelf members to position the inner ends of the shelf members 131 and 132, while the outer ends of said shelf members may be positioned at the outer end walls 126a and 127a of the respective supply compartments through the agency of cap screws 142 extending through corresponding openings 143 in the outer end walls 144 of the respective compartments.

A suitable opening 151 is provided in the upper wall 119 of the housing 110, and a movable cover or lid 152 provided with an operating knob 153 is disposed above the opening 151 in position such as to be moved into and out of closing relation to said opening 151 after the manner of the lid 34 shown in connection with the first described form of the device, the lid member 152 being provided with a transparent window or the like 154 and being linked to the coin-controlled dispensing mechanism so as to be raised manually only when a bottle or series of bottles 155 is disposed immediately below the opening 151.

The manner of operation of this form of device is entirely comparable to that above described, the receptacle 113 being rotated through the agency of the hand wheel 9 until the desired bottle is discernible through the window 154, the necessary coin is inserted in the coin selector mechanism 40, and the lid 152 may then be raised and the desired bottle 155 withdrawn. During the withdrawal operation the position of the receptacle 113 will be fixed as described above in connection with the first form of the invention, and as the outermost bottle 155 is withdrawn, the follower or backing plate 133 will force the adjacent inwardly disposed bottles outwardly against a stop member 156 corresponding in function and position to the stop members 76 and 108 above. In this connection the side walls of respective supply compartments 126 and 127 will be slotted as at 126' and 127' to permit rotation of the receptacle 113.

The shelf 132 mounted in the compartment 127 shown in section in Fig. 13 is disposed at its lowermost level within such supply compartment, accommodating bottles 155 of the maximum height, while the shelf 131 disposed in the supply compartment 126 at the right-hand side of Fig. 13 is shown in an upper position to accommodate a comparatively short bottle 158, and it will be seen that the upper ends of the various bottles are disposed at substantially the same level, in position to be grasped by the hand of the user.

The bottom wall 128 of the receptacle 113 may be provided with openings to facilitate cross-circulation of the cooling air from the associated refrigerating element, if desired, the open structure of the support spider 117 further contributing to such circulation.

Numerous modifications of the herein disclosed forms of apparatus will occur to those skilled in the art, and I obviously do not choose to be limited to these specific modifications, but rather to the scope of the subjoined claims. For example, it will be appreciated that the form shown in Figs. 8–11 may be modified according to the teaching of Fig. 12, without departing from the spirit and scope of my present invention.

1. A vending device of the character described, which comprises: an external housing, partition means defining a supply receptacle within said housing, said supply receptacle comprising a plurality of elongated supply compartments arranged in side-by-side relation with one end of the compartments disposed in alinement with one another to define a discharge zone for said receptacle; biasing means in each of said compartments, said compartments being adapted to receive a plurality of containers in upright position and disposed in a series arrangement along the length of the respective compartments, and said biasing means being positioned to bias the containers of such series toward said one end into said discharge zone; a shelf member disposed within each of said supply compartments; positioning means associated with each of said compartments and cooperating with said shelf member to position the same in any one of a plurality of vertically spaced positions to define a lower wall for each of said compartments; a coin-controlled dispensing member mounted on said external housing and relatively movable with respect to said supply receptacle, said dispensing member having a dispensing opening located adjacent said discharge zone of said supply receptacle, and a movable door member adapted for movement between positions covering and exposing said aperture; and an actuating member for effecting relative movement between said dispensing member and said supply receptacle whereby said aperture may be placed in alinement with any one of said supply compartments.

2. A vending device as set forth in claim 1, said supply receptacle being rectilinear in shape with said plurality of elongated supply receptacles being arranged in side-by-side parallel relation, and the relative movement of said supply receptacle and said dispensing member being linear in a direction transverse to the direction of elongation of said supply compartments.

3. A vending device as set forth in claim 1, said supply receptacle being generally circular in shape, with said supply compartments being disposed in radial side-by-side relation and said discharge zone being generally circular in shape and defined by the radially outward ends of said supply compartments.

4. A vending device as set forth in claim 1, said dispensing member being fixed relative to said housing and said supply receptacle being relatively movable within said housing, and comprising in addition a stop member fixedly secured to said housing and extending inwardly of said supply receptacle at a position intermediate the positions of two adjacent containers in said series arrangement at the aforesaid discharge zone of said supply receptacle, the side walls of said supply receptacle being provided with an opening through which said stop member may pass upon movement of said receptacle with respect to said housing.

5. A vending device of the character described, which comprises: an external housing; partition means defining a supply receptacle within said housing, said supply receptacle comprising a plurality of elongated supply compartments arranged in side-by-side parallel relation and in transverse alinement with one another at one end to define a discharge zone of said supply receptacle, each supply compartment being adapted to receive a plurality of containers in upright position disposed in a series arrangement along the length of such compartment, and including means for biasing the containers of such series toward said one end of such compartment; a coin-controlled dispensing member mounted on said external housing, said dispensing member and said supply receptacle being relatively movable, one with respect to the other in a direction transverse to the length of said elongated supply compartments, said dispensing member being provided with a dispensing opening located adjacent the aforesaid discharge zone of said supply receptacle and a movable door member adapted for movement between positions covering and exposing said aperture; and an actuating member for effecting relative movement between said dispensing member and said supply receptacle whereby said aperture may be placed in alinement with any one of said supply compartments.

6. A vending device as set forth in claim 5, said dispensing member being fixed relative to said housing, and said supply receptacle being relatively movable within said housing.

7. A vending device as set forth in claim 5, said supply receptacle being fixed relative to said housing, and said dispensing member being slidably mounted on said housing for relative movement with respect to said supply receptacle.

8. A vending device as set forth in claim 5, said dispensing member being fixed relative to said housing, and said supply receptacle being relatively movable within said housing, and comprising in addition a stop member secured to said housing and extending inwardly of said supply receptacle at a position intermediate the positions of two adjacent bottles in said series arrangement at the aforesaid discharge zone of said supply receptacle.

9. A vending device as set forth in claim 5, said supply receptacle being fixed relative to said housing, and said dispensing member being slidably mounted on said housing for relative movement with respect to said supply receptacle, and comprising in addition a stop member secured to said housing and extending inwardly of said supply receptacle at a position intermediate the positions of two adjacent containers in said series arrangement at the aforesaid discharge zone of said supply receptacle.

10. A vending device as set forth in claim 5, said means for biasing said containers of each series comprising a spring biased pressure plate slidably mounted with respect to such compartment for longitudinal movement therein, and adapted to engage the last container in such series and resiliently bias the same towards said one end.

11. A vending device of the character described, which comprises: an external housing; partition means defining a supply receptacle within said housing, said supply receptacle comprising a plurality of elongated generally horizontally extending supply compartments arranged in side-by-side parallel relation and in alinement with one another at said one end to define a discharge zone of said supply receptacle; a shelf member and cooperating positioning means disposed within each supply compartment and adjustable vertically therein at any one of a plurality of vertical positions to establish a lower wall for said compartment, each supply compartment being adapted to receive a plurality of containers in upright positions disposed in a series arrangement along the length of such compartment, and each shelf member including a biasing member positioned to engage the last container of such series and resiliently bias the containers of said series toward said one end of such compartment; a coin-controlled dispensing member mounted on said external housing, said dispensing member and said supply receptacle being relatively movable one with respect to the other in a direction transverse to the length of said elongated supply compartment, said dispensing member being provided with a dispensing opening located adjacent the aforesaid discharge zone of said supply receptacle and the movable door member adapted for movement between positions covering and exposing said aperture; and an actuating member for effecting relative movement between said dispensing member and said supply receptacle whereby said aperture may be placed in alinement with any one of said supply compartments.

12. A vending device as set forth in claim 11, said dispensing member being fixed relative to said housing, and said supply receptacle being relatively movable within said housing.

13. A vending device as set forth in claim 11, said supply receptacle being fixed relative to said housing, and said dispensing member being slidably mounted on said housing for relative movement with respect to said supply receptacle.

14. A vending device as set forth in claim 11, said dispensing member being fixed relative to said housing, and said supply receptacle being relatively movable within said housing, and comprising in addition a stop member secured to said housing and extending inwardly of said supply receptacle at a position intermediate the positions of two adjacent containers in said series arrangement at the aforesaid discharge zone of said supply receptacle.

15. A vending device as set forth in claim 11, said supply receptacle being fixed relative to said housing, and said dispensing member being slidably mounted on said housing for relative movement with respect to said supply receptacle, and comprising in addition a stop member secured to said housing and extending inwardly of said supply receptacle at a position intermediate the positions of two adjacent containers in said series arrangement at the aforesaid discharge zone of said supply receptacle.

16. A vending device of the character described, which comprises: an external housing; a cylindrical internal supply receptacle mounted for rotation about a generally vertical axis; partition means in said supply receptacle defining a plurality of radially arranged elongated supply compartments, the radially outer ends of said supply compartments being arranged in peripheral alinement to define a generally circular discharge zone, each supply compartment being adapted to receive a plurality of containers in upright position disposed in a radially extending series, and including means for biasing the containers of such series radially outwardly toward said discharge zone; a shelf member disposed within each of said supply compartments; positioning means associated with each of said supply compartments and cooperating with said shelf member to position the same in any one of a plurality of vertically spaced positions to define a lower wall for each of said compartments; a coin-controlled dispensing member mounted on said external housing and provided with a dispensing opening located adjacent the aforesaid discharge zone of said supply receptacle and a movable door member adapted for movement between positions covering and exposing said aperture; and an actuating member extending exteriorly of said housing and associated with said supply receptacle for effecting rotation thereof whereby said aperture may be placed in alinement with any one of said supply compartments.

17. The vending device set forth in claim 16, and comprising in addition a stop member secured to said housing and extending into said supply receptacle at a position intermediate the two outermost containers in said radially extending series at the aforesaid discharge zone of said supply receptacle.

18. A vending device of the character described, which comprises: an external housing; a cylindrical internal supply receptacle mounted for rotation about a generally vertical axis; partition means in said supply receptacle defining a plurality of radially arranged elongated supply compartments, the radial outer ends of said supply compartments being arranged in peripheral alinement to define a generally circular discharge zone, each supply compartment being adapted to receive a plurality of containers in upright position disposed in a radially extending series; a shelf member disposed within each of said supply compartments, said shelf member being provided with an upwardly extending pressure plate member slidably mounted thereon for movement in a radial direction and biasing means operatively associated with said pressure plate member to bias the same radially outwardly; a coin-controlled dispensing member mounted on said external housing and provided with a dispensing opening located adjacent the aforesaid discharge zone of said supply receptacle and a movable door member adapted for movement between positions covering and exposing said aperture; and an actuating member extending exteriorly of said housing and associated with said supply receptacle for effecting rotation thereof whereby said aperture may be placed in alinement with any one of said supply compartments.

19. The vending device set forth in claim 18, and comprising in addition a stop member fixedly secured to said housing and extending into said supply receptacle at a position intermediate the two outermost containers in said radially extending series at the aforesaid discharge zone of said supply receptacle.

20. A vending device of the character described which comprises: an external housing; a cylindrical internal supply receptacle mounted for rotation about a generally vertical axis; partition means in said supply receptacle defining a plurality of radially arranged elongated supply compartments, the radially outer ends of said supply compartments being arranged in peripheral alinement to define a generally circular discharge zone, each supply compartment being adapted to receive a plurality of containers in upright position disposed in a radially extending series; a shelf member disposed within each of said supply compartments, said shelf member being provided with an upwardly extending pressure plate member slidably mounted thereon for movement in a radial direction and biasing means operatively associated with said pressure plate member to bias the same radially outwardly; a coin-controlled dispensing member mounted on said external housing and provided with a dispensing opening located adjacent the aforesaid discharge zone of said supply receptacle and a movable door member adapted for movement between positions covering and exposing said aperture; a stop member fixedly secured to said housing and extending downwardly into said supply receptacle at a position intermediate the two outermost containers in a radially extending series at the aforesaid discharge zone of said supply receptacle, the partition means defining said plurality of radially arranged elongated supply compartments being each provided with a slotted opening located at the same radial separation from said vertical axis as said stop member, through which said stop member may pass upon rotation of said receptacle with respect to said housing; and an actuating member extending exteriorly of said housing and associated with said supply receptacle for effecting rotation thereof whereby said aperture may be placed in alinement with any one of said supply compartments.

MILLER S. KING.